Oct. 26, 1948.                E. C. WALKER                2,452,407
                                FILTER
                          Filed Jan. 12, 1945
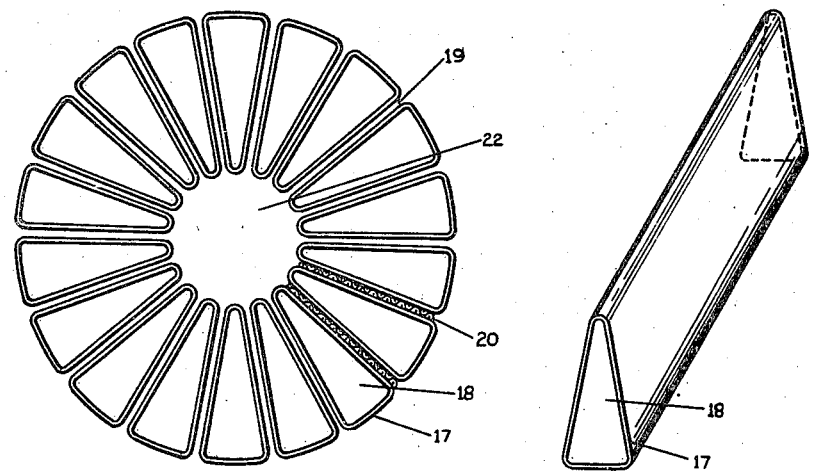
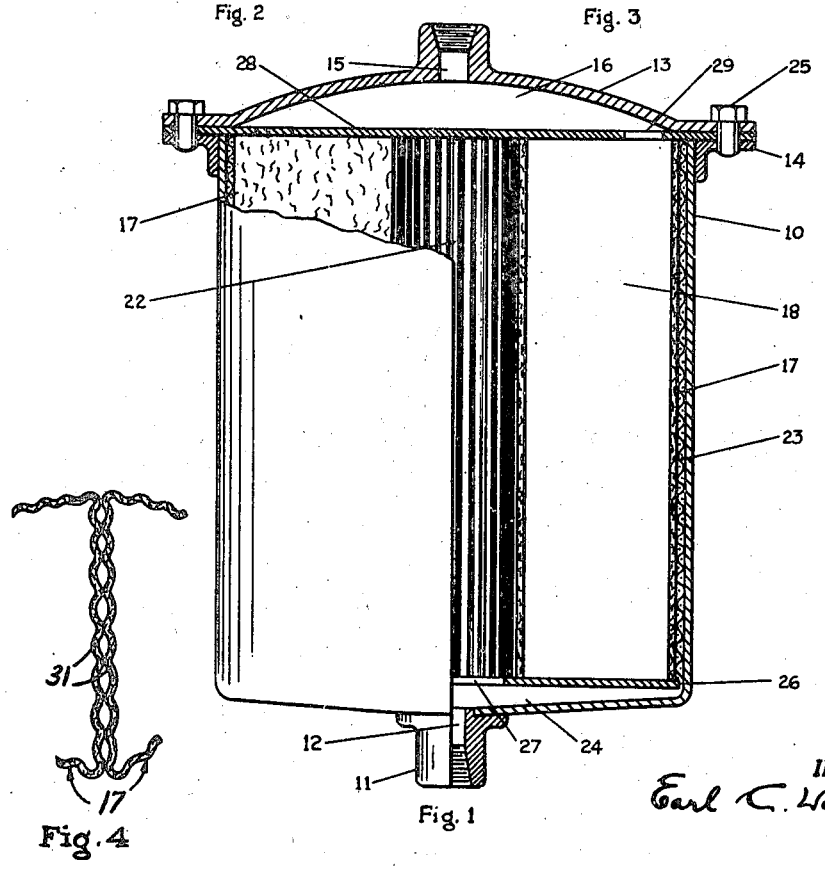
INVENTOR.
Earl C. Walker Patented Oct. 26, 1948

2,452,407

UNITED STATES PATENT OFFICE 2,452,407

FILTER

Earl C. Walker, Altadena, Calif.

Application January 12, 1945, Serial No. 572,471

6 Claims. (Cl. 210—169)

This invention relates to filters, and particularly to oil filters, adapted for use with internal combustion engines.

One object of this invention is to provide a filter having an extensive area in a comparatively small volumetric space. Another object is to provide a filter element of low cost.

Another object is to provide a filter element that traps within itself the impurities, such as carbon, sludge, etc., entrained in the oil, so that they are removed en masse with the filter element when its effective life has been spent and it is desired to replace it with a new element; thus the filter casing and the system is not contaminated.

Another object is to provide a filter composed of elements that can readily be produced from porous material, such as fiber paper stock for example.

These and other objects will be apparent from the following description and the drawings.

Figure 1 shows a partial sectional elevation of a filter assembly.

Figure 2 is a plan view showing how unit elements are grouped to form a filter unit.

Figure 3 shows in perspective a tubular element.

Figure 4 is a substantially diagrammatic fragmentary and exaggerated sectional view of the walls of adjacent filter units wherein the surface is irregular to provide rudimentary drainage channels.

Referring to Figure 1, a casing 10 is provided at its lower end with an outlet connection 11 having a conduit duct 12 therethrough, and with an outwardly extending flange 14 embracing its open end. A dished cover-plate 13 provided with an inlet connection having an inlet conduit duct 15 has a flat rim which mates with the flange 14 of the casing and is secured thereto by screws 25, or by any other suitable means. Within the casing 10 is mounted the filter unit which is an embodiment of this invention, and comprises a plurality of filtration tubes 17 of sectorial form whose ends are attached and sealed to header-plates 26 and 28 which may be of sheet cork or any other suitable material. The top header-plate 28 is provided with apertures 29 which register and communicate with the interior 18 of the tubular elements 17, and the outer rim of this header-plate extends over the flange 14 and is clamped between it and the flat rim of the cover 13, thus acting as a diaphragm to separate the casing 10 into two compartments. The bottom header-plate 26 is provided with a central aperture 27 which intercommunicates with the axial passage 22, clearly shown in Figure 2, and the space 24 between the lower header-plate 26 and the bottom of the casing 10.

In Figure 3 is shown one of the unit filtration tubes which is preferably made of porous fiber paper material by the extrusion process, or by molding. I do not limit myself to such material however, but may use any suitable filtration material. These tubes are substantially triangular in cross section, but are actually sectorial in contour with truncated rounded apexes, so that when grouped as shown in Figure 2 with their apexes turned inwardly and their flank walls in close relation they form a cylindrical asemblage with an axial passage 22 in its center and with radial passages 19 between the flank walls of the tubes 17 diverging therefrom to afford drainage passage-ways for the filtrate. To maintain the passages 19 between the contiguous flank walls of the elemental filtration tubes 17, strips of wire screen 20, or any suitable foraminous material may be employed; or felt, cloth or other filtration material in lieu of wire screen may be employed and thus provide a secondary stage of filtration; or spacers may be entirely eliminated by providing means integral with the surfaces of the tubes for maintaining interstitial passages for the filtrate therebetween, for example the exterior surfaces of the filtration tubes may be roughened, grooved, corrugated or papillose in character to form rudimentary channels and ridges as indicated by 31 in Figure 4, and also as disclosed in Patent No. 2,352,300, issued June 27, 1944, to E. C. Walker et al.

After the elemental filtration tubes are bonded to header-plates 26 and 28 to form the filter unit assemblage as shown in Figure 1, a belt of wire screen 23, or perforate metal, is installed to encompass the arced bases of the assembled tubes to space same from the interior surface of the cylindrical casing 10, thereby providing a drainage passage for the filtrate.

Oil or other filterable fluid enters the filter through the port 15 of the cover-plate 13 and flows radially in the space 16 above the top header-plate 28 to the ports 29 therein, and fills the cells 18 defined by the tubes 17 and the header-plates 26 and 28 respectively, and since its only means of escape is through the porous walls of the tubes, it is thus filtered, and then the filtrate flows through the passages exteriorly of the tubes to the space 24 beneath the filter unit and then out of the casing 10 through the conduit port 12 in the outlet connection 11.

It is obvious that all extraneous matter entrained in the oil that is filtered out is trapped and segregated inside the cells 18 of this filter unit, so that the entire filter unit containing such sludge, carbon, etc., may be removed en masse and discarded and without any required cleaning or any possibility of contaminating the casing or the system with such extraneous matter. A new filter unit may readily be inserted in the casing for continued operation.

As this filter unit is constructed so that part of the walls of its elemental tubes are supported by the casing and the remaining portions constituting the flank walls thereof are contiguously opposed so that they transmit internal pressure, one against the other, so that they are self-supporting, any conventional oil pressure may be used without any danger of rupturing its walls which would allow impurities to pass through and defeat its functional purpose.

A filter unit such as disclosed in this specification affords a very extensive area in a comparatively small volumetric space, whereby oil may be filtered at a sufficient rate and whereby the life of the filter is sufficient to meet requirements. It is also simple in construction and lends itself to mass production at low cost.

While the single embodiment herein shown is thought to clearly illustrate the invention, it should be understood that the invention extends to other forms, arrangements, structures, and details falling within the scope and spirit thereof and not sacrificing all of its material advantages.

What is claimed is:

1. A filtering unit comprising: a plurality of filtering cells each of sectoral cross-section and open at their axial ends, said cells being grouped about a common center to form compositely an annular open-ended cylinder, the side walls of said filtering cells extending radially and disposed in mutually supported relation to resist the force of fluid under pressure within said cells; means forming interstitial drainage passages communicating with the inner and outer peripheries of said cylinder; headers common to said cells and sealed to the otherwise open axial extremities thereof, one of said headers defining an opening communicating with the center of said cylinder, the other having openings communicating with the interiors of said cells.

2. A filter construction as set forth in claim 1, wherein said drainage passage forming means includes: rudimentary channels and ridges formed in the contacting radial external surfaces of said cells.

3. A construction as set forth in claim 1, wherein said drainage passage means includes: foraminous members inserted between, and clamped by, the opposed walls of said cells.

4. A filter unit comprising: a plurality of relatively fragile fibrous filter cells, the walls of which are unable to withstand unaided the pressure differentials imposed by the flow of a filtrate therethrough, each of said cells being in the form of a cylindrical sector with radially inner sides of rudimentary width, said cells adapted to be grouped to form compositely a hollow cylinder with their radial walls in mutual supporting relation whereby the internal pressure in each cell is opposed by the internal pressure in the adjacent cells; a housing for receiving the cylinder formed by said cells and adapted to support against internal pressure the radially outer sides thereof; means between the mutually supported radial walls of said cells and between said housing and the radially outer walls of said cells defining a multiplicity of rudimentary unsupported areas forming interstitial drainage passages; and headers common to the axial extremities of said cells and sealed thereto, one of said headers defining openings communicating with said interstitial drainage passages and the other header defining openings communicating with the interiors of said cells.

5. A filter construction as et forth in claim 4, wherein said interstitial drainage passage forming means includes: rudimentary channels and ridges formed integrally in the walls of said filtering cells.

6. A filter construction as set forth in claim 4, wherein said interstitial drainage passage forming means includes: foraminous elements interposed and clamped between the mutually supporting sides of said cells and other foraminous means interposed between the radial outer walls of said cells and said housing whereby the radial pressure in said cells is transferred to said housing.

EARL C. WALKER.

REFERENCES CITED

The following references are of record in the file of this patent:

UNITED STATES PATENTS

| Number | Name | Date |
|---|---|---|
| 1,728,305 | Raney | Sept. 17, 1929 |
| 1,750,935 | Maunula et al. | Mar. 18, 1930 |
| 1,754,320 | Hopkins | Apr. 15, 1930 |
| 1,810,965 | Hopkins | June 23, 1931 |
| 2,042,564 | Sweetland | June 2, 1936 |
| 2,337,574 | Sloan et al. | Dec. 28, 1943 |
| 2,352,300 | Walker et al. | June 27, 1944 |
| 2,358,238 | Lindblad | Sept. 12, 1944 |

FOREIGN PATENTS

| Number | Country | Date |
|---|---|---|
| 4,028 | Great Britain | 1882 |
| 29,132 | Austria | July 10, 1907 |
| 327,234 | Great Britain | Apr. 3, 1930 |
| 401,287 | Great Britain | Oct. 30, 1933 |
| 533,208 | France | Dec. 3, 1921 |